(12) United States Patent
Marsden et al.

(10) Patent No.: US 10,121,005 B2
(45) Date of Patent: *Nov. 6, 2018

(54) VIRUS DETECTION BY EXECUTING ELECTRONIC MESSAGE CODE IN A VIRTUAL MACHINE

(71) Applicant: TRUSTWAVE HOLDINGS, INC., Chicago, IL (US)

(72) Inventors: Walter L. Marsden, Provo, UT (US); David L. Green, Pleasant Grove, UT (US)

(73) Assignee: TRUSTWAVE HOLDINGS, INC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/595,001

(22) Filed: May 15, 2017

(65) Prior Publication Data

US 2017/0249463 A1 Aug. 31, 2017

Related U.S. Application Data

(63) Continuation of application No. 12/113,010, filed on Apr. 30, 2008, now Pat. No. 9,652,613, which is a
(Continued)

(51) Int. Cl.
*G06F 21/56* (2013.01)
*G06F 21/53* (2013.01)

(52) U.S. Cl.
CPC ............ *G06F 21/566* (2013.01); *G06F 21/53* (2013.01); *G06F 2221/033* (2013.01); *G06F 2221/2149* (2013.01)

(58) Field of Classification Search
CPC ........ G06F 21/566; G06F 21/56; G06F 21/53; G06F 2221/2149
See application file for complete search history.

(56) References Cited

U.S. PATENT DOCUMENTS 3,858,182 A 12/1974 Delagi et al.
5,278,901 A 1/1994 Shieh et al.
(Continued)

FOREIGN PATENT DOCUMENTS

EP 0578041 B1 1/1994
WO 9721313 A1 6/1997
(Continued)

OTHER PUBLICATIONS

United States Patent and Trademark Office, "Notice of Allowance", issued in connection with U.S. Appl. No. 12/130,634, dated Jul. 23, 2012, 7 pages.
(Continued)

*Primary Examiner* — Carl G Colin
*Assistant Examiner* — Gary E Lavelle
(74) *Attorney, Agent, or Firm* — Hanley Flight & Zimmerman, LLC.

(57) ABSTRACT

Virus detection by executing electronic message code in a virtual machine is disclosed. An example method includes detecting that an electronic message includes executable code, the electronic message designating a destination recipient. Two or more destination computing systems are identified for the electronic message corresponding to the destination recipient specified in the electronic message prior to delivery of the electronic message to the two or more destination computing systems, the two or more destination computing systems including a first destination computing system and a second destination computing system different from the first destination computing system. Two or more simulation environments corresponding to the two or more destination computing systems are identified. The executable code is executed in the two or more simulation environments. The two or more simulation environments are
(Continued)

monitored for a malicious action. The electronic message is delivered to the destination recipient if the action is detected.

16 Claims, 4 Drawing Sheets

Related U.S. Application Data continuation-in-part of application No. 11/356,570, filed on Feb. 17, 2006, which is a continuation-in-part of application No. 10/299,452, filed on Nov. 18, 2002, now Pat. No. 7,607,171, said application No. 12/113,010 is a continuation-in-part of application No. 11/012,742, filed on Dec. 15, 2004, which is a continuation-in-part of application No. 10/299,452, filed on Nov. 18, 2002, now Pat. No. 7,607,171, said application No. 12/113,010 is a continuation-in-part of application No. 10/933,967, filed on Sep. 3, 2004, which is a continuation-in-part of application No. 10/299,452, filed on Nov. 18, 2002, now Pat. No. 7,607,171.

(60) Provisional application No. 60/349,019, filed on Jan. 17, 2002, provisional application No. 60/529,638, filed on Dec. 15, 2003, provisional application No. 60/499,589, filed on Sep. 3, 2003.

(56) References Cited

U.S. PATENT DOCUMENTS

| | | |
|---|---|---|
| 5,440,723 A | 8/1995 | Arnold et al. |
| 5,542,044 A | 7/1996 | Pope |
| 5,623,600 A | 4/1997 | Ji et al. |
| 5,696,822 A | 12/1997 | Nachenberg |
| 5,826,013 A | 10/1998 | Nachenberg |
| 5,832,208 A | 11/1998 | Chen et al. |
| 5,842,002 A | 11/1998 | Schnurer et al. |
| 5,889,943 A | 3/1999 | Ji et al. |
| 5,901,228 A | 5/1999 | Crawford |
| 5,974,549 A | 10/1999 | Golan |
| 5,983,348 A | 11/1999 | Ji |
| 5,987,610 A | 11/1999 | Franczek et al. |
| 6,006,328 A | 12/1999 | Drake |
| 6,065,118 A | 5/2000 | Bull et al. |
| 6,067,410 A | 5/2000 | Nachenberg |
| 6,088,801 A | 7/2000 | Grecsek |
| 6,092,194 A | 7/2000 | Touboul |
| 6,094,731 A | 7/2000 | Waldin et al. |
| 6,108,799 A | 8/2000 | Boulay et al. |
| 6,154,844 A | 11/2000 | Touboul et al. |
| 6,269,447 B1 | 7/2001 | Maloney et al. |
| 6,272,641 B1 | 8/2001 | Ji |
| 6,275,938 B1 | 8/2001 | Bond et al. |
| 6,330,590 B1 | 12/2001 | Cotton |
| 6,363,352 B1 | 3/2002 | Dailey et al. |
| 6,643,686 B1 | 11/2003 | Hall |
| 6,691,230 B1 | 2/2004 | Bardon |
| 6,694,435 B2 | 2/2004 | Kiddy |
| 6,701,438 B1 | 3/2004 | Prabandham et al. |
| 6,732,179 B1 | 5/2004 | Brown et al. |
| 6,775,780 B1 | 8/2004 | Muttik |
| 6,973,577 B1 | 12/2005 | Kouznetsov |
| 6,981,279 B1 | 12/2005 | Arnold et al. |
| 6,981,280 B2 | 12/2005 | Grupe |
| 6,990,513 B2 | 1/2006 | Belifore et al. |
| 7,017,187 B1 | 3/2006 | Marshall et al. |
| 7,058,822 B2 | 6/2006 | Edery et al. |
| 7,237,264 B1 | 6/2007 | Graham et al. |
| 7,607,171 B1 | 10/2009 | Marsden et al. |
| 9,652,613 B1 | 5/2017 | Marsden et al. |
| 2002/0007453 A1 | 1/2002 | Nemovicher |
| 2002/0013910 A1 | 1/2002 | Edery et al. |
| 2002/0029350 A1 | 3/2002 | Cooper et al. |
| 2002/0049817 A1 | 4/2002 | Drory et al. |
| 2002/0069369 A1 | 6/2002 | Tremain |
| 2002/0116635 A1 | 8/2002 | Sheymov |
| 2002/0129281 A1 | 9/2002 | Haffalvi et al. |
| 2002/0162015 A1 | 10/2002 | Tang |
| 2002/0162025 A1 | 10/2002 | Sutton et al. |
| 2003/0009689 A1 | 1/2003 | Kolb |
| 2003/0065943 A1 | 4/2003 | Geis et al. |
| 2003/0097409 A1 | 5/2003 | Tsai |
| 2003/0159070 A1 | 8/2003 | Mayer et al. |
| 2004/0006706 A1 | 1/2004 | Erlingsson |
| 2004/0034794 A1 | 2/2004 | Mayer et al. |
| 2004/0148514 A1 | 7/2004 | Fee et al. |
| 2004/0215971 A1 | 10/2004 | Nam |
| 2004/0255161 A1 | 12/2004 | Cavanaugh |
| 2004/0268147 A1 | 12/2004 | Wiederin et al. |
| 2005/0273856 A1 | 12/2005 | Huddleston |
| 2006/0015939 A1 | 1/2006 | Aston et al. |
| 2006/0174343 A1 | 8/2006 | Duthie et al. |
| 2006/0195894 A1 | 8/2006 | Nita et al. |
| 2006/0253906 A1 | 11/2006 | Rubin et al. |
| 2007/0294744 A1 | 12/2007 | Alessio et al. |
| 2008/0098476 A1 | 4/2008 | Syversen |
| 2008/0134337 A1 | 6/2008 | Crescenzo et al. |
| 2008/0172738 A1 | 7/2008 | Bates et al. |
| 2008/0289040 A1 | 11/2008 | Ithal |
| 2009/0222922 A1 | 9/2009 | Sidiroglou et al. |
| 2010/0146615 A1 | 6/2010 | Locasto et al. |

FOREIGN PATENT DOCUMENTS

| | | |
|---|---|---|
| WO | 9819482 A1 | 5/1998 |
| WO | 9832304 A2 | 7/1998 |

OTHER PUBLICATIONS

United States Patent and Trademark Office, "Final Office action", issued in connection with U.S. Appl. No. 12/130,659, dated Oct. 21, 2011, 16 pages.

United States Patent and Trademark Office, "Non-Final Office action", issued in connection with U.S. Appl. No. 10/299,452, dated Aug. 18, 2008, 11 pages.

United States Patent and Trademark Office, "Final Office action", issued in connection with U.S. Appl. No. 10/299,452, dated Dec. 7, 2007, 10 pages.

United States Patent and Trademark Office, "Non-Final Office action", issued in connection with U.S. Appl. No. 10/299,452, dated Jul. 23, 2007, 13 pages.

United States Patent and Trademark Office, "Non-Final Rejection", issued in connection with U.S. Appl. No. 11/356,570, dated Oct. 31, 2007, 25 pages.

United States Patent and Trademark Office, "Non-Final Office action", issued in connection with U.S. Appl. No. 10/299,452, dated Jun. 22, 2006, 14 pages.

United States Patent and Trademark Office, "Final Office action", issued in connection with U.S. Appl. No. 10/299,452, dated Jan. 11, 2007, 11 pages.

United States Patent and Trademark Office, "Non-Final Office action", issued in connection with U.S. Appl. No. 10/933,967, dated Dec. 7, 2007, 15 pages.

United States Patent and Trademark Office, "Final Office action", issued in connection with U.S. Appl. No. 10/933,967 dated Jul. 12, 2007, 19 pages.

United States Patent and Trademark Office, "Non-Final Office action", issued in connection with U.S. Appl. No. 10/933,967, dated Feb. 7, 2007, 24 pages.

United States Patent and Trademark Office, "Non-Final Office action", issued in connection with U.S. Appl. No. 11/012,742, dated Oct. 31, 2007, 24 pages.

United States Patent and Trademark Office, "Notice of Allowance", issued in connection with U.S. Appl. No. 10/299,452, dated Jun. 8, 2009, 14 pages.

(56) References Cited

OTHER PUBLICATIONS

United States Patent and Trademark Office, "Notice of Allowance", issued in connection with U.S. Appl. No. 12/130,609, dated Mar. 19, 2012, 19 pages.

United States Patent and Trademark Office, "Non-Final Office action", issued in connection with U.S. Appl. No. 12/130,609, dated Oct. 21, 2011, 12 pages.

United States Patent and Trademark Office, "Non-Final Office action", issued in connection with U.S. Appl. No. 12/130,659, dated Mar. 14, 2012, 20 pages.

United States Patent and Trademark Office, "Non-Final Office action", issued in connection with U.S. Appl. No. 13/156,971, dated Mar. 18, 2014, 35 pages.

United States Patent and Trademark Office, "Non-Final Office action", issued in connection with U.S. Appl. No. 12/130,659, dated Apr. 14, 2011, 16 pages.

United States Patent and Trademark Office, "Notice of Allowance", issued in connection with U.S. Appl. No. 12/130,634, dated Apr. 2, 2012, 9 pages.

United States Patent and Trademark Office, "Notice of Allowance", issued in connection with U.S. Appl. No. 12/113,010, dated Jan. 12, 2017, 11 pages.

United States Patent and Trademark Office, "Non-Final Office action", issued in connection with U.S. Appl. No. 12/113,010, dated Apr. 28, 2011, 15 pages.

United States Patent and Trademark Office, "Final Office action", issued in connection with U.S. Appl. No. 12/113,010, dated Oct. 7, 2011, 14 pages.

United States Patent and Trademark Office, "Non-Final Office action", issued in connection with U.S. Appl. No. 12/113,010, dated Mar. 23, 2012, 16 pages.

United States Patent and Trademark Office, "Final Office action", issued in connection with U.S. Appl. No. 12/113,010, dated May 5, 2014, 29 pages.

United States Patent and Trademark Office, "Non-Final Office action", issued in connection with U.S. Appl. No. 12/113,010, dated Jan. 2, 2015, 25 pages.

United States Patent and Trademark Office, "Final Office action", issued in connection with U.S. Appl. No. 12/113,010, dated Jul. 17, 2015, 32 pages.

United States Patent and Trademark Office, "Non-Final Office action", issued in connection with U.S. Appl. No. 12/113,010, dated Dec. 2, 2015, 32 pages.

United States Patent and Trademark Office, "Final Office action", issued in connection with U.S. Appl. No. 12/113,010, dated Jun. 3, 2016, 39 pages.

United States Patent and Trademark Office, "Final Office action", issued in connection with U.S. Appl. No. 12/130,634, dated Nov. 30, 2011, 15 pages.

United States Patent and Trademark Office, "Non-Final Office action", issued in connection with U.S. Appl. No. 12/130,634, dated Apr. 12, 2011, 14 pages.

Garfinkel et al., "A virtual machine introspection based architecture for intrusion detection", published in Proc. Net. and Distributed Sys. Sec. Symp., Feb. 2003, 16 pages.

VIRUS DETECTION BY EXECUTING ELECTRONIC MESSAGE CODE IN A VIRTUAL MACHINE

CROSS-REFERENCE TO RELATED APPLICATIONS

This application arises from a continuation of U.S. patent application Ser. No. 12/113,010 entitled "Virus Detection by Executing Electronic Message Code in a Virtual Machine," filed on Apr. 30, 2008. U.S. patent application Ser. No. 12/113,010 is a continuation-in-part of U.S. patent application Ser. No. 11/356,570 entitled "Virus Detection by Executing Electronic Message Code in a Virtual Machine," filed on Feb. 17, 2006, which is a continuation-in-part and claims priority from U.S. patent application Ser. No. 10/299,452, entitled "Virus Detection by Executing E-Mail Code in A Virtual Machine," filed on Nov. 18, 2002, which claims priority, under 35 U.S.C. § 119(e), to U.S. Provisional Application No. 60/349,019, entitled "Isolation Server Email Quarantine System for Email Virus Protection," filed Jan. 17, 2002. U.S. patent application Ser. No. 12/113,010 is also a continuation-in part of U.S. patent application Ser. No. 11/012,742 entitled "Virus Detection By Executing Code Associated with a Virtual Machine That Uses Configuration Information to Emulate Destination Environments," filed on Dec. 15, 2004, which is a continuation-in-part and claims priority from U.S. patent application Ser. No. 10/299,452, entitled "Virus Detection by Executing E-Mail Code in A Virtual Machine," filed on Nov. 18, 2002, which claims priority, under 35 U.S.C. § 119(e), to U.S. Provisional Application No. 60/349,019 entitled "Isolation Server Email Quarantine System for Email Virus Protection," filed Jan. 17, 2002. U.S. patent application Ser. No. 11/012,742 also claims priority, under 35 U.S.C. § 119(e), to U.S. Provisional Application No. 60/529,638 entitled "Software Process of Determining Appropriate Network Client Environment for Use In a Virus Detection System that Executes E-Mail Code in a Virtual Machine," filed Dec. 15, 2003. U.S. patent application Ser. No. 12/113,010 is also a continuation-in-part of U.S. patent application Ser. No. 10/933,967 entitled "Virus Detection by Executing Code Associated with Outbound or Intra-Organizational E-Mail Code in a Virtual Machine," filed on Sep. 3, 2004, which is a continuation-in-part and claims priority from U.S. patent application Ser. No. 10/299,452, entitled "Virus Detection by Executing E-Mail Code in A Virtual Machine," filed on Nov. 18, 2002, which claims priority, under 35 U.S.C. § 119(e), to U.S. Provisional Application No. 60/349,019, entitled "Isolation Server Email Quarantine System for Email Virus Protection," filed Jan. 17, 2002; U.S. patent application Ser. No. 10/933,967 also claims priority, under 35 U.S.C. § 119 (e), to U.S. Provisional Application No. 60/499,589 entitled "Analyzing and Isolating Outbound Network Traffic" filed on Sep. 3, 2003. Each of U.S. patent application Ser. No. 12/113,010, U.S. patent application Ser. No. 11/356,570, U.S. patent application Ser. No. 10/299,452, U.S. Provisional Patent Application No. 60/349,019, U.S. patent application Ser. No. 11/012,742, U.S. Provisional Patent Application No. 60/529,638, U.S. patent application Ser. No. 10/933,967, and U.S. Provisional Patent Application No. 60/499,589 are incorporated by reference herein in their entireties.

BACKGROUND OF THE INVENTION

1. The Field of the Invention

The present invention relates to network security technologies, and more specifically, to mechanisms for detecting viruses by executing code associated with an electronic message in a virtual machine.

2. Background and Relevant Art

Computing technology has revolutionized the way people work and play and has contributed enormously to the advancement of humankind. Computers now aid in innumerable applications such as word processing, computer simulations, advanced gaming, voice recognition, among many more. With the advancement of networking technology, computing systems (and their associated users) may access and exchange information from all over the globe using any Internet-enabled computing system such as a desktop computer, a laptop computer, a Personal Digital Assistant (PDA), a mobile telephone, or the like. Accordingly, never before have so many had so ready access to so much information. Computers and networking technologies have played such a major role in our lives that recent years have been dubbed the "information age."

E-mail and instant messaging applications, for example, allow one user to send an electronic text message to another user. Most typically, that electronic text message would be delivered much quicker than would a letter delivered via conventional postal service. It can take a matter of minutes, seconds, or potentially even just fractions thereof, to deliver an electronic text message over many miles or even between continents. Needless to say, e-mail and instant messaging have revolutionized communications and have provided a significant contribution to the quality of life for many millions of people.

One of the advantages of e-mail, for example, is that it allows for the delivery of text messages with attachments. The attachments may be of almost any type, even executable types such as ".dll" or ".exe" files or script files such as Javascript or VB script. When one selects an executable attachment, the attachment is typically executed. Executable code may also be embedded within the e-mail so as to be executed simply by opening the e-mail. For example, a-ails may now be in HyperText Markup Language (HTML) format, which permits script language to be executed when the HTML e-mail is simply opened.

Instant messaging is advantageous in that it permits rapid two-way text communications to occur much like a real-life conversation might occur. However, more recently, it has become possible to send files within instant messages. An instant message may even have an executable file or script as an attachment, or may include executable script in the text of the instant message itself.

Unfortunately, some in our society have discovered that they can inflict harm on others by sending e-mail or instant messages with associated executable code that is harmful or viral in nature, whether that code be an attachment or embedded within the e-mail or instant message. The executable code is specifically drafted such that, when executed, harm is inflicted upon the receiving computing system and/or the viral code is replicated and sent to yet other computing systems. Typically, the associated text message and/or the name of the attachment is maliciously designed to induce the user to select the attachment to thereby induce the execution of the harmful attachment. If the executable code is simply embedded in the e-mail, then mere opening of the e-mail is sufficient to cause the harm. It is anticipated that many millions, if not billions, of dollars of economic harm have been lost due to such harmful e-mail code. Also, with the rapid proliferation of instant messaging technologies, instant messaging has become an attractive target for virus authors.

Firewalls can help greatly in protecting against such attacks in some cases. Conventionally, firewalls may maintain a list of known viruses and potentially their structural characteristics. If the firewall detects electronic message code that matches these characteristics, the firewall does not allow for delivery of the electronic message. The mechanism works well for known viruses. However, new viruses are constantly being written and/or discovered. In addition, there can typically be significant time between the time that the virus is discovered and the time that the firewall is updated to protect against the new virus. Accordingly, a new virus can cause widespread harm before protective measures are put in place, even assuming the protection of a conventional firewall.

Another more dramatic approach allows system administrators to disallow the delivery of any executable attachment at all. However, there are many legitimate reasons to deliver executable attachments via e-mail. Disallowing all executable attachment deliveries would impair the meeting of such legitimate needs. Furthermore, an electronic message may still be delivered that has executable code other than in attachment form.

One conventional virus detection mechanism described by U.S. Pat. No. 6,775,780 issued Aug. 10, 2004 to Muttik (hereinafter referred to as "Muttik") emulates and analyzes code such as that which may be associated with a received e-mail in order to estimate that when execution of the code is likely to result in malicious behavior. During the emulation process, the suspect code makes a number of system calls. These system calls are compared against profiles of system calls that are made by malicious programs. A decision on whether or not the code is malicious is made by comparing the actual system call pattern generated by emulating the code against system call patterns that are characteristic of malicious code.

However, monitoring patterns of system calls can result in an inaccurate determination as to whether or not actual malicious behavior will result. For example, some patterns of system calls may cause harm on one environment, but not another. Furthermore, the Muttik relies on knowledge of malicious system call patterns. This method has a tendency toward 'false positives', or false alarms because innocent code could also make similar calls. However, operating systems are becoming increasingly complex. As a result, there may be unknown system call patterns that result in malicious harm. This may be especially true the more complex the system call patterns, and the more complex the operating system. It may even be possible to generate viral behaviors without using system calls.

Furthermore, as newer operating systems are introduced, those newer operating systems may have different vulnerabilities to different system call patterns. Accordingly, a comparison to a single database of system call patterns (without regard for the ultimate environment in which the system calls will be made) may result in inaccurate predictions of farm or safety. This is especially true in an environment in which there may be many new versions of operating systems forthcoming. Furthermore, viral behavior may be different depending on other software configurations.

Accordingly, what would be advantageous are mechanisms that mitigate harm caused by viral electronic messages by accurately detecting viral behavior as it would occur in it intended destination environment even in cases when the associated virus has not yet been identified or discovered.

BRIEF SUMMARY OF THE INVENTION

The foregoing problems with the prior state of the art are overcome by the principles of the present invention, which are directed towards methods, systems, computer program products, and data structures for detecting viruses by actually executing electronic message code in a contained environment that emulates its intended environment. Examples of electronic messages include e-mail, instant messages, or any other message that may be communicated over a network. After receiving an electronic message by an intermediary server that protects the ultimate destination computing system, the intermediary computing system determines that the electronic message has associated executable code, and then identifies the destination environment. The computing system then executes the code by emulating how it would be executed in its ultimate environment. However, filters are placed in the emulation architecture so that a virus-like behavior may be detected. The electronic message is delivered with its associated executable code after the code is executed in the emulated environment and no virus-like behavior is detected.

If virus-like behavior is detected in the emulated environment, then appropriate action may be taken. Such appropriate action may include stripping the executable code from the electronic message; notifying the user, all served users, and/or the system administrator of the detection of the virus; noting the sender of the electronic message and refusing or restricting future electronic messages from that same sender; or the like. The administrator can at his/her option, look at contained electronic message and manually determine if they should be forwarded.

The executable code is emulated in a contained and isolated environment at the intermediary computing system. Any harm caused to the intermediary computing system remains at the intermediary computing system as the intermediary computing system may disallow the code causing other electronic messages to be written or forwarded. Accordingly, the virus is not permitted to propagate itself in any way. Only the intermediary computing system is affected.

Furthermore, the emulation environment may emulate any number of different destination environments using configuration information specific for any given destination environment. Accordingly, the emulation more accurately reflects actual action that would likely be taken if the executable code were to actually be executed at the destination computing system, thereby more accurately predicting viral behaviors. This mitigates the problem of false positives which is prevalent in other systems that simply try to guess what the actual outcome of an executable may be. The result is far more accurate because it allows the suspected executable to be executed within an environment that either exactly matches or most closely matches the intended recipient's environment.

In order to further contain the virus and reduce harm caused even at the intermediary computing system, the intermediary computing system may disallow disk writes outside of a predetermined disk space, may disallow the writing or reading of registry entries outside of a particular contained portion of the registry, or the like. Accordingly, even if harm is caused to the contained environment, the contained environment may be restarted in a clean state by rebooting the intermediary computing system, or by starting a clean image of the emulated target environment.

Even if the virus was not known at the time the attachment was executed, harmful actions may still be detected and the virus recognized for what it is. Accordingly, there is no window of vulnerability between the time the virus is developed and the time that a firewall is updated to account for the new virus. Accordingly, the principles of the present invention allow for the detection of a virus even before it is publicly known and recognized.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
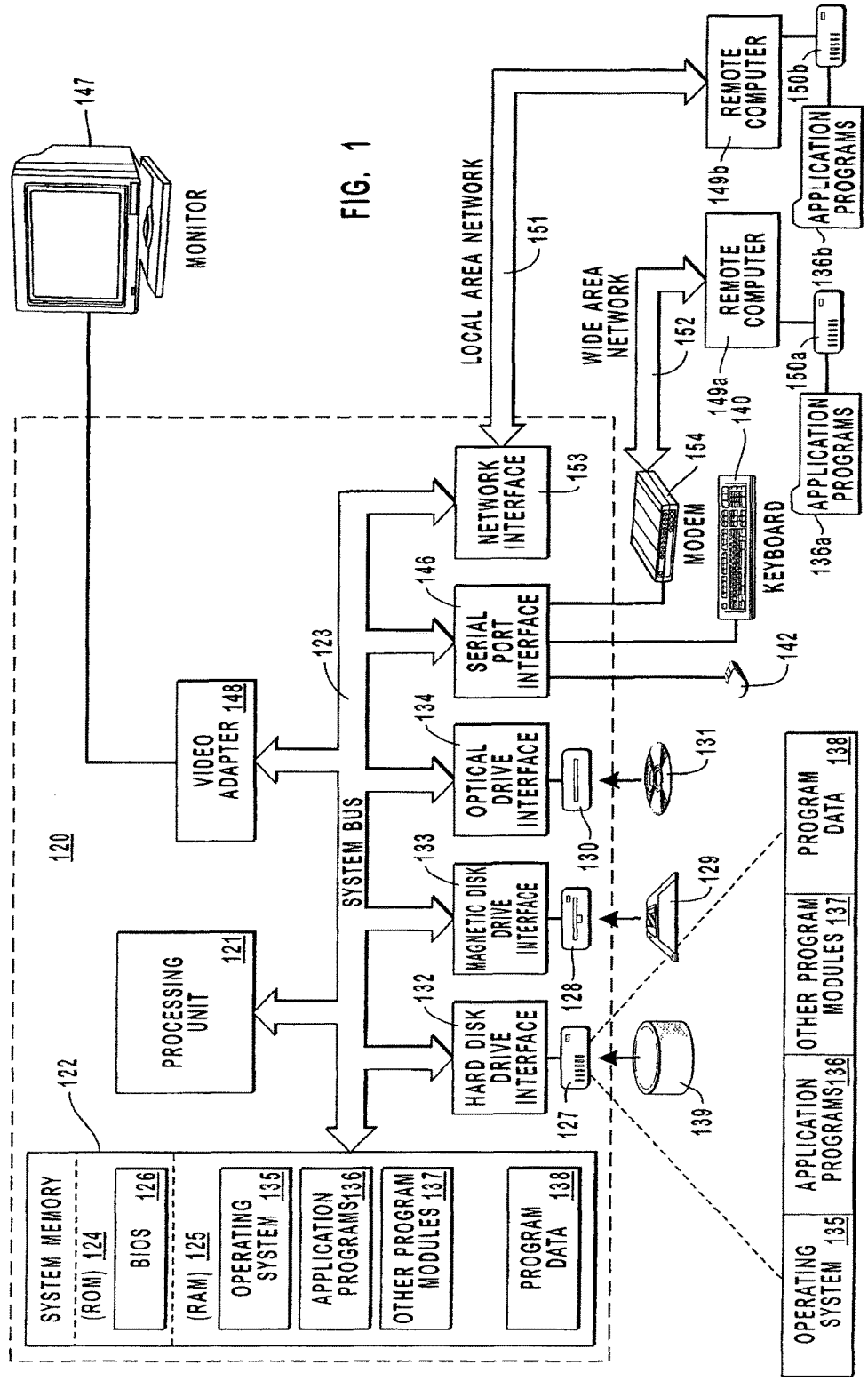
FIG. 1 illustrates a suitable operating environment for the principles of the present invention.

After an intermediary server receives an electronic message with associated executable code, the intermediary computing system determines that the electronic message has executable code, and then identifies the intended destination environment. The computing system then executes the code by emulating how it would be executed in its ultimate environment. If a virus-like behavior is detected, appropriate action is taken to prevent the execution of the associated code at the intended destination of the electronic message. In an embodiment, the computing system accesses configuration information associated with the associated with the intended destination computing system, and executes the associated executable code in an environment that emulates the intended destination computing system using the accessed configuration information. The configuration information may differ depending on the environment on the destination computing system, and may be dependent on software running on the destination computing system, as well as configuration settings of such software. Because the configuration information is specific to the particular destination environment, the emulation may be made much more accurate. The computing system then determines whether the emulated execution results in any viral action to occur in the emulated environment. Appropriate action may then be taken based on this determination. Specifically, the electronic message may be contained, and not forwarded to the intended recipient. The associated code is executed in a contained environment that allows for the contained environment to be easily restarted in a clean state.

Embodiments within the scope of the present invention include computer-readable media for carrying or having computer-executable instructions or data structures stored thereon. Such computer-readable media can be any available media which can be accessed by a general purpose or special purpose computer. By way of example, and not limitation, such computer-readable media can comprise physical computer-readable media such as RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer.

When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, any instructions and data which cause a general purpose computer, special purpose computer, or special purpose processing device to perform a certain function or group of functions. The computer-executable instruction may be, for example, binaries, intermediate format instructions such as assembly language, or even source code.

FIG. 1 and the following discussion are intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions represents examples of corresponding acts for implementing the functions described in such steps.

Those skilled in the art will appreciate that the invention may be practiced in network computing environments with many types of computer system configurations, including personal computers, hand-held devices such as Personal Digital Assistants (PDAs) and/or mobile telephones, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

With reference to FIG. 1, an exemplary system for implementing the invention includes a general purpose computing device in the form of a conventional computer 120, including a processing unit 121, a system memory 122, and a system bus 123 that couples various system components including the system memory 122 to the processing unit 121. The system bus 123 may be any of several types of bus structures including a memory bus or memory controller, a peripheral bus, and a local bus using any of a variety of bus architectures. The system memory includes read only memory (ROM) 124 and random access memory (RAM) 125. A basic input/output system (BIOS) 126, containing the basic routines that help transfer information between elements within the computer 120, such as during start-up, may be stored in ROM 124.

The computer 120 may also include a magnetic hard disk drive 127 for reading from and writing to a magnetic hard disk 139, a magnetic disk drive 128 for reading from or writing to a removable magnetic disk 129, and an optical disk drive 130 for reading from or writing to removable optical disk 131 such as a CD-ROM or other optical media. The magnetic hard disk drive 127, magnetic disk drive 128, and optical disk drive 130 are connected to the system bus 123 by a hard disk drive interface 132, a magnetic disk drive-interface 133, and an optical drive interface 134, respectively. The drives and their associated computer-readable media provide nonvolatile storage of computer-executable instructions, data structures, program modules and other data for the computer 120. Although the exemplary environment described herein employs a magnetic hard disk 139, a removable magnetic disk 129 and a removable optical disk 131, other types of computer readable media for storing data can be used, including magnetic cassettes, flash memory cards, digital video disks, Bernoulli cartridges, RAMs, ROMs, and the like.

Program code means comprising one or more program modules may be stored on the hard disk 139, magnetic disk 129, optical disk 131, ROM 124 or RAM 125, including an operating system 135, one or more application programs 136, other program modules 137, and program data 138. A user may enter commands and information into the computer 120 through keyboard 140, pointing device 142, or other input devices (not shown), such as a microphone, joy stick, game pad, satellite dish, scanner, or the like. These and other input devices are often connected to the processing unit 121 through a serial port interface 146 coupled to system bus 123. Alternatively, the input devices may be connected by other interfaces, such as a parallel port, a game port or a universal serial bus (USB). A monitor 147 or another display device is also connected to system bus 123 via an interface, such as video adapter 148. In addition to the monitor, personal computers typically include other peripheral output devices (not shown), such as speakers and printers.

The computer 120 may operate in a networked environment using logical connections to one or more remote computers, such as remote computers 149a and 149b. Remote computers 149a and 149b may each be another personal computer, a server, a router, a network PC, a peer device or other common network node, and typically include many or all of the elements described above relative to the computer 120, although only memory storage devices 150a and 150b and their associated application programs 136a and 136b have been illustrated in FIG. 1. The logical connections depicted in FIG. 1 include a local area network (LAN) 151 and a wide area network (WAN) 152 that are presented here by way of example and not limitation. Such networking environments are commonplace in office-wide or enterprise-wide computer networks, intranets and the Internet.

When used in a LAN networking environment, the computer 120 is connected to the local network 151 through a network interface or adapter 153. When used in a WAN networking environment, the computer 120 may include a modem 154, a wireless link, or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing communications over wide area network 152 may be used.

While FIG. 1 illustrates an example of a computing system that may implement the principles of the present invention, any computing system may implement the features of the resent invention. In the description and in the claims, a "computing system" is defined broadly as any hardware component or components that are capable of using software to perform one or more functions. Examples of computing systems include desktop computers, laptop computers, Personal Digital Assistants (PDAs), telephones, or any other system or device that has processing capability.

Figure 2:
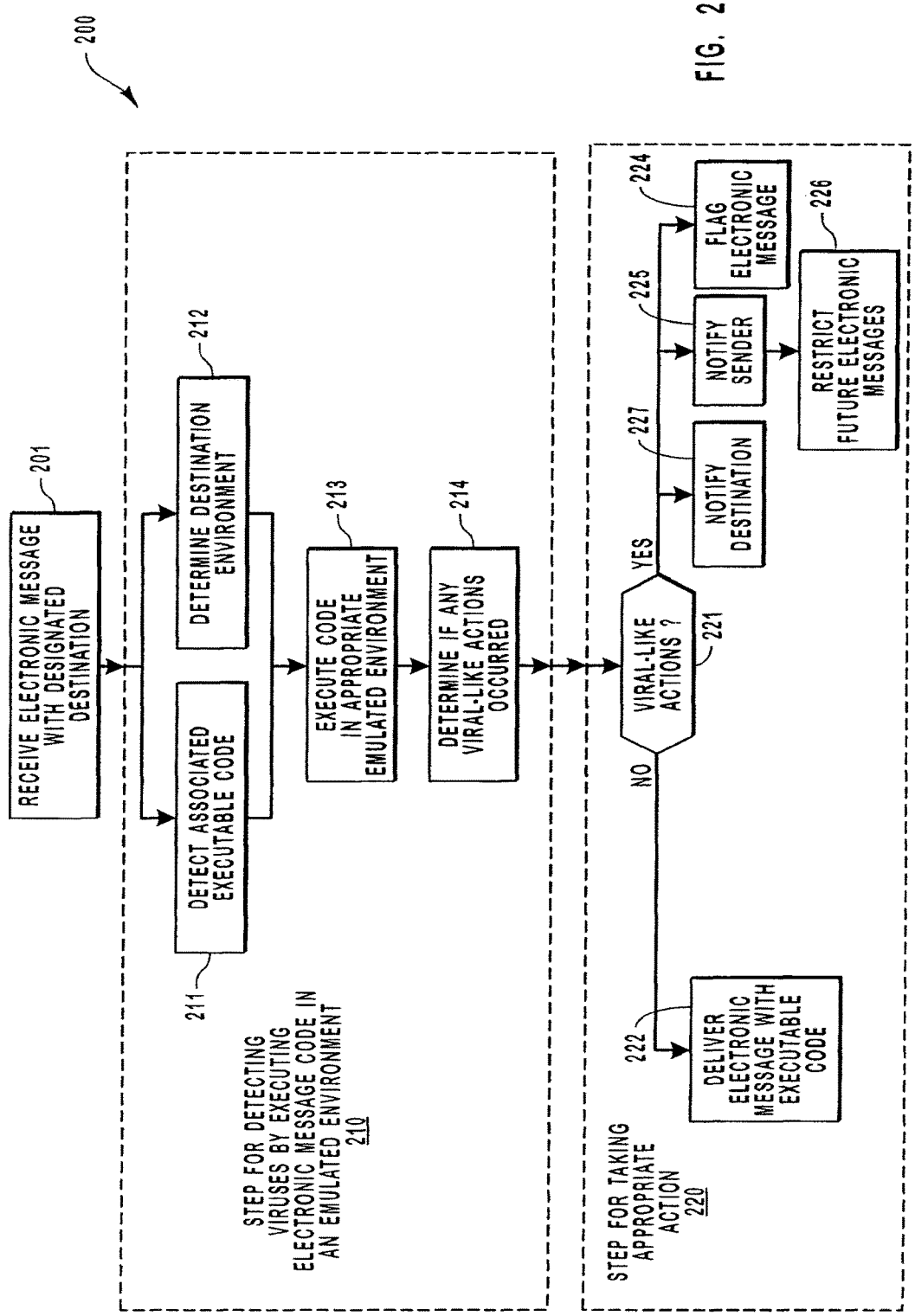
FIG. 2 illustrates a flowchart of a method for detecting electronic message code viruses in accordance with the principles of the present invention.
Figure 3:
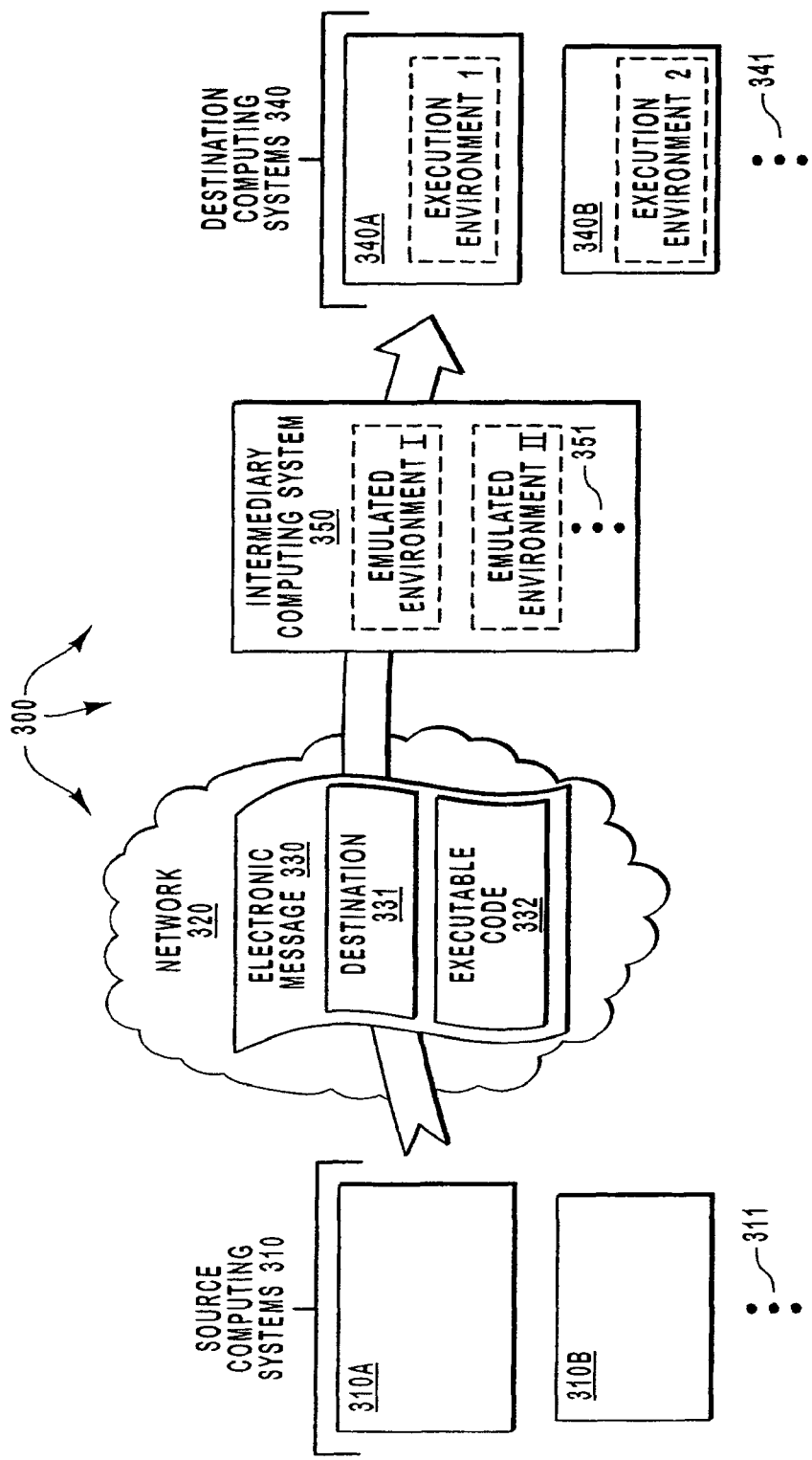
FIG. 3 schematically illustrates a network environment in which the method of FIG. 2 may be employed without harming the intended destination.

FIG. 2 illustrates a flowchart of a method 200 for detecting that executable code associated with an electronic message is harmful if executed at its intended destination. FIG. 3 illustrates a network architecture 300 in which the principles of the present invention may be employed. As the method 200 may operate within the network architecture 300, the description of FIG. 2 and FIG. 3 is largely intertwined for clarity.

The network architecture 300 includes a number of source computing systems 310 including source computing systems 310A and 310B and potentially including many more as represented by the vertical ellipses 311. The network architecture 300 includes a number of destination computing systems 340 including destination computing systems 340A and 340E and potentially including many more as represented by the vertical ellipses 341. Although not required, each of the source computing systems 310 and the destination computing systems 340 may be structured as described above for the computer 120. However, the computing systems 340 may take any other form including hand-held devices such as Personal Digital Assistants. At least one of the source computing systems 310 is capable of transmitting an electronic message with associated executable code to at least one of the destination computing systems 340 over a network 320 such as the Internet. Although the destination computing systems 340 may be structured as described above for the computer 120, the computing systems 340 may take any other form including hand-held devices such as Personal Digital Assistants. For example, in FIG. 3, source computing system 310A is sending an electronic message 330 over the network 320 to the destination computing system 340A. Note that as electronic message technology is bi-directional, destination computing systems 340 may also be capable of sending electronic messages, while source computing systems 310 may also be capable of receiving electronic messages.

The intermediary computing system 350 isolates the destination computing systems 340 from harm caused by any viral-actions that might be induced by executable code associated with any in-coming electronic messages as described below with respect to method 200.

The method 200 includes an act of receiving an electronic message that designates at least one intended computing system (act 201). For example, the intermediary computing system 350 receives the electronic message 330 from the source computing system 310A. The electronic message 330 includes a destination address field 331 that designating at least one intended destination computing system (in this case, the destination computing system 340A). The electronic message 330 may be, for example, an e-mail, an electronic message or any other message that is capable of having associated with it executable code.

The method 200 then includes a functional, result-oriented step for detecting viruses by executing electronic message code in an emulated environment (step 210). This step 210 includes any corresponding acts for accomplishing the execution in the emulated environment. However, in the illustrated embodiment, the step 210 includes corresponding acts 211, 212, 213 and 214.

More specifically, the step 210 includes a corresponding act of detecting that the electronic message has associated executable code (act 211). For example, the intermediary computing system detects executable code 332 associated with the electronic message 330. The executable code 332 may be one or more executable attachments, or any other executable code that is contained within the electronic message, or combinations thereof.

The step 210 also includes a corresponding act of determining an environment of the at least one intended destination computing system (act 212). For example, the intended destination computing system may be determined, for example, determining that a destination computing system corresponds to a destination e-mail address specified in the electronic message, or is part of a group of computing systems corresponding to a destination e-mail address specified in the electronic message. The acts 211 and 212 are shown in parallel to emphasize that it is not important whether the environment of the intended destination computing system occurs before, after, and/or at the same time as the act of determining whether there is executable code associated with the electronic message.

The environment may include the operating system and other configuration information running on the intended destination computing system such as, a processor-type, a type of computing system, other client software or programs that may be running, or the like. For example, destination computing system may include an execution environment 1. That execution environment 1 may include, for example, the MICROSOFT WINDOWS XP operating system. The intermediary server 350 includes an emulated environment I that emulates the execution environment. In an embodiment, emulated environment I includes configuration information, such as operating system information, application programs, other software included on the destination computing system, settings of the application programs or other software included on the destination computing system. Use of the configuration information allows the environment to emulate different types of destination computing environments, such as a generic Microsoft Office® environment, a specific development environment used for programming, a workstation environment used for specific purposes or any other environment used on a computing platform. In an embodiment, each different environment includes different operating systems and includes different application programs.

Note that other destination computing systems (e.g., destination computing system 340B) have different execution environments (e.g., execution environment 2). The execution environment 2 may include a completely different operating system than the execution environment 1. For example, execution environment 2 may include, for example, MICROSOFT WINDOWS 2000, MICROSOFT WINDOWS 98, or any non-MICROSOFT operating system. Accordingly, the intermediary server 350 includes an emulated environment II that emulates the execution environment 2. The intermediary server 350 may emulate other environments as well as represented by the vertical ellipses 351.

The emulated environment is similar to the execution environment except for the existence of filters that detect viral behavior, and except that at least some viral behavior may be either blocked from occurring, or contained within an isolated environment.

The step 210 also includes a corresponding act of executing the associated executable code in an environment that emulates the environment of at least one intended destination computing system (act 213). For example, since the destination computing system 340A implements the execution environment 1, the intermediary server 350 executes the executable attachment 332 using the emulated environment I. Accordingly, the intermediary computing system uses the same operating system to execute the electronic message code as would the destination computing system.

Figure 4:
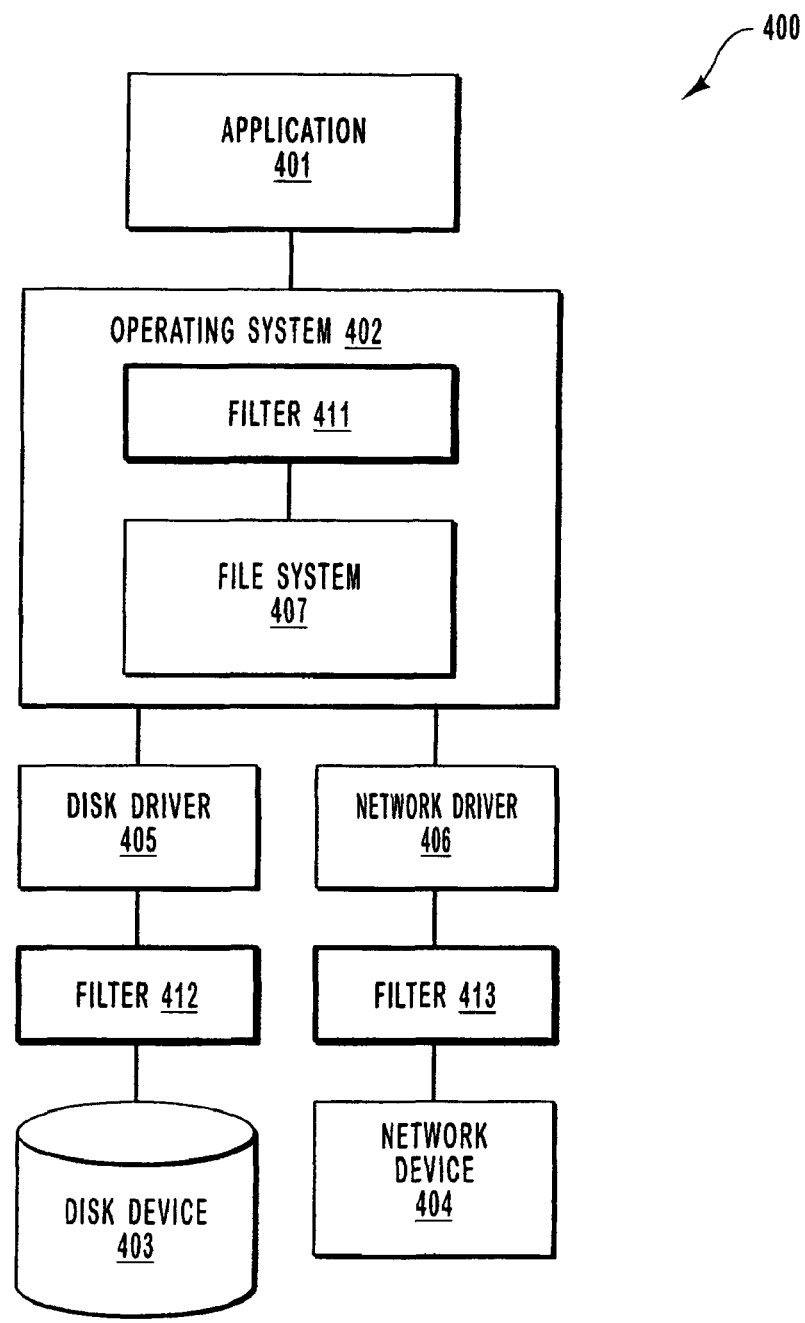
FIG. 4 illustrates a software architecture that may be employed to detect electronic message viruses in accordance with the principles of the present invention.

The step 210 then includes a corresponding act of determining whether the act of executing results in any of one or more viral-like actions to occur in the emulated environment. act 214). Such potential viral actions may include any behavior which contributes towards the unnecessary and disproportionate use of processor, memory, or network connection resources, which accesses system resources without authorization, which replicates itself or a derivative of itself, which automatically causes the electronic message and/or the associated code (or a derivative thereof) to be sent to other computing systems, which executes disk reads or writes, which accesses the system registry, which accesses any address list, and/or which alters any part of the physical or logical system. An emulation architecture that detects such viral behavior is illustrated in FIG. 4 as emulated environment 400.

The emulated environment 400 includes some components that may be found in any standard computing system such as, for example, an application 401, an operating system 402, a disk device 403 (and an associated disk driver 405), and a network device 404 (and an associated network driver 406). When the emulated environment 400 is implemented by the computer 120 described above with respect to FIG. 1, the application 401 may be, for example, one of the application programs 136. The operating system 402 may be, for example, the operating system 135 and may include a file system 407. The disk device 403 may be, for example, the hard disk 139. The network device 404 may be, for example, the network interface or adapter 153, modem 154, or any other wireless, wired or combination of wired and wireless means for connecting to a network.

There are also a number of filters placed strategically within the emulated environment. These filters are illustrated as elements 411, 412 and 413 and are outlined with bold lines for clarity. The filters operate to check the behavior of the executing code by monitoring the impact of the execution on the surrounding software and hardware, and also by monitoring for requests that a non-viral executable attachment should not be interested in requesting. Some operating system manufacturers provide a mechanism that allows for the insertion of filters in various points of a computer architecture. These filter mechanisms may be used in developing and implementing this system.

For example, filter 411 monitors all file system requests made to the file system 407. Viral-like actions that the filter 411 may be checking for may include, for example, any requests to access an address book maintained by the file system. This is one of the key aspects involved in the spread of a virus in the virus' ability to propagate itself. In the past, some viruses have propagated themselves by forwarding the associated electronic message to all or some of the entities within the address book of the infected computing system. There is also very few, if any, legitimate reasons for an executable attachment to want access to an address book. Accordingly, checking an address book is indicative of viral-like behavior. The filter 411 may also detect any behaviors in which there is an attempt to modify or overwrite a pre-existing file, or write a new file to or read a sensitive file from the file system since legitimate executable attachments will typically not do this.

The filter 412 may check to determine if there is any attempt to modify sector zero of the disk. Sector zero is used by the operating system 402 and the disk driver 405 to understand the overall structure of the disk device 403 or a partition thereof. Any external modification of sector zero would almost certainly result in the contents of the disk device 403 being completely inaccessible and thus lost.

The filter 412 may also check for any direct access of the disk device 403. Direct accesses include accessing the disk device without using the usual APIs provided by the operating system. There should be little reason for such direct access since the operating system 402 itself provides access to the disk device. Bypassing the operating system 402 may also bypass other security features inherent within the operating system 402, and thus allow for more harmful tampering of the disk device.

The filter 413 monitors for any resulting attempts to send anything over the network. An executable attachment would have little, if any, legitimate need to send anything over a network. In addition, since sending objects over a network is a primary means for viruses replicating and propagating themselves in a network environment, any attempts to send information are indicative of viral-like behavior. Sending numerous messages over a network may also be indicative of a denial of service attack. The attempts to send electronic messages in response to this code execution are preferably blocked so as to contain any potential harm to the contained environment of the intermediary computing system.

The filters may be modified and updated as new viral-like behaviors are discovered. For example, system time requests may be blocked if time-bomb viruses are a concern. In addition, new filters may be added wherever a potential viral-like behavior may occur.

In addition to the automated detection of virus-like behavior the intermediary computing system 250 may give the system administrator viewing rights to any suspected executable code, and optionally allow the system administrator to allow the electronic message to be forwarded even if virus-like behavior was detected.

Referring once again to FIG. 2, once it has been determined whether the act of executing results in any of one or more viral actions to occur in the emulated environment, the method 200 includes a step for taking appropriate action (step 220). The step 220 could include any corresponding appropriate acts. The appropriateness of such acts will, of course, depend on whether viral actions have been detected.

The emulated environment 400 may be contained so that any viral-like behavior that is actually permitted to run its course in the emulated environment may be more easily recovered from. For example, the disk filter 412 may have a specific partitioned portion of the disk device 403 (or even a separate disk device altogether) that is dedicated for use when executing an executable attachment. Other more essential information is on a different partition or disk. If the virus corrupts the partition of the disk or the disk that is dedicated for use when executing the executable attachment, only that partition or disk is affected. The more essential components are safely stored within another portion of the disk. Disallowing any tampering to sector zero enforces this. Accordingly, one need only reboot the computing system and/or reinitialize the partition or disk. Furthermore, viral-behaviors are not permitted to exit the contained environment by using a network.

If viral-like actions have not been detected (NO in decision block 221), then the corresponding acts may include the act of delivering the electronic message with the associated executable code to the intended destination computing system (act 222). If viral actions have been detected (YES in decision block 221), then the corresponding acts may include an act of flagging the electronic message as having an associated viral code (act 224), an act of determining a sender of the electronic message virus (act 225) followed by an act of restricting future electronic message deliveries from the sender (act 226), and an act of notifying the at least one intended destination computing system (and/or a corresponding system administrator) that an electronic message has been detected that may result in viral actions to occur (act 227).

Appropriate action may depend on which viral-like behavior(s) have been detected since some behaviors are certain signs of viral-like behavior, and some are only indications of viral-like behavior. The appropriate actions may also depend on the threat of harm that could be caused by the detected viral-like behavior.

Note that the method 200 may be implemented for any number of destination computing systems having dissimilar execution environments. For example, just as the intermediary computing system 350 executed the executable code 332 in the emulated environment I, the intermediary computing system 350 may also execute other executable code directed towards the destination computing system 340B within an appropriate emulation environment such as emulated environment II. Accordingly, since viral behaviors are detected by emulating the actual environment in which the executable code would be executed if the electronic message was delivered and the executable code executed, a more diverse set of clients may be served, and it is more likely that viral behavior would be detected. This represents a significant advancement, and indeed a major paradigm shift, in the art of virus detection software.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

We claim:

1. A method for analyzing executable code associated with electronic messages, the method comprising:
   detecting that an electronic message includes executable code, the electronic message designating a destination recipient;
   identifying, for the electronic message, by executing an instruction with a processor, two or more destination computing systems corresponding to the destination recipient specified in the electronic message prior to delivery of the electronic message to the two or more destination computing systems, the two or more destination computing systems including a first destination computing system and a second destination computing system different from the first destination computing system;
   identifying two or more different simulation environments respectively corresponding to the two or more destination computing systems;
   executing the executable code in the two or more simulation environments;
   monitoring, by executing an instruction with the processor, for a malicious action in response to execution of the executable code in the two or more simulation environments; and
   delivering the electronic message to the destination recipient if the malicious action is not detected.

2. The method of claim 1, further including flagging the electronic message as having malicious executable code when the action is detected.

3. The method of claim 1, further including:
   determining a sender of the electronic message; and
   restricting future electronic message deliveries from the sender when the malicious action is detected.

4. The method of claim 1, further including notifying a receiving user that the electronic message may be harmful, the notifying occurring when the malicious action is detected.

5. The method of claim 1, further including notifying a system administrator that the electronic message may be harmful, the notifying occurring when the malicious action is detected.

6. The method of claim 1, wherein the executable code is an attachment of the electronic message.

7. The method of claim 1, wherein the executable code is embedded within a body of the electronic message.

8. The method of claim 1, wherein the malicious action includes at least one of accessing a recipient book, modifying a file, or reading a file.

9. The method of claim 1, wherein the malicious action includes modifying sector zero of a storage disc or storage device.

10. A tangible machine readable hardware storage disk or storage device comprising instructions which, when executed, cause a machine to at least:
    detect that an electronic message includes executable code, the electronic message designating a destination recipient;
    identify, for the electronic message, two or more destination computing systems corresponding to the destination recipient specified in the electronic message prior to delivery of the electronic message to the two or more destination computing systems, the two or more destination computing systems including a first destination computing system and a second destination computing system different from the first destination computing system;
    identify two or more different simulation environments corresponding respectively to the two or more destination computing systems;
    execute the executable code in the two or more simulation environments;
    monitor for a malicious action in response to execution of the executable code in the two or more simulation environments; and
    deliver the electronic message to the destination recipient if the malicious action is not detected.

11. The tangible machine readable hardware storage disk or storage device of claim 10, wherein the instructions, when executed, further cause the machine to flag the electronic message as having malicious executable code when the malicious action is detected.

12. The tangible machine readable hardware storage disk or storage device of claim 10, wherein the instructions, when executed, further cause the machine to at least:
    determine a sender of the electronic message; and
    restrict future electronic message deliveries from the sender when the malicious action is detected.

13. The tangible machine readable hardware storage disk or storage device of claim 10, wherein the instructions, when executed, further cause the machine to notify a receiving user that the electronic message may be harmful, the notifying occurring when the malicious action is detected.

14. The tangible machine readable hardware storage disk or storage device of claim 10, wherein the instructions, when executed, further cause the machine to notify a system administrator that the electronic message may be harmful, the notifying occurring when the malicious action is detected.

15. The tangible machine readable hardware storage disk or storage device of claim 10, wherein the executable code is an attachment of the electronic message.

16. The tangible machine readable hardware storage disk or storage device of claim 10, wherein the executable code is embedded within a body of the electronic message.

* * * * *